US012453423B2

(12) United States Patent
Boyer

(10) Patent No.: US 12,453,423 B2
(45) Date of Patent: Oct. 28, 2025

(54) KITCHEN HELPER FOLDING STEP STOOL

(71) Applicant: Dorel Home Furnishings, Inc., Wright City, MI (US)

(72) Inventor: Jason A. Boyer, Columbus, IN (US)

(73) Assignee: Dorel Home Furnishings, Inc., Wright City, MO (US)

(*) Notice: Subject to any disclaimer, the term of this patent is extended or adjusted under 35 U.S.C. 154(b) by 1120 days.

(21) Appl. No.: 17/339,258

(22) Filed: Jun. 4, 2021

(65) Prior Publication Data

US 2021/0378405 A1 Dec. 9, 2021

Related U.S. Application Data

(60) Provisional application No. 63/034,718, filed on Jun. 4, 2020.

(51) Int. Cl.

| | |
|---|---|
| ***A47C 12/00*** | (2006.01) |
| ***E06C 1/387*** | (2006.01) |
| ***E06C 1/393*** | (2006.01) |

(52) U.S. Cl.

CPC .............. *A47C 12/00* (2013.01); *E06C 1/387* (2013.01); *E06C 1/393* (2013.01)

(58) Field of Classification Search

CPC ...... A47C 12/00; A47D 13/08; A47D 15/005; E06C 1/387; E06C 1/393

See application file for complete search history.

(56) References Cited

U.S. PATENT DOCUMENTS

| | | | | | |
|---|---|---|---|---|---|
| 2,952,301 | A * | 9/1960 | Schlaak | E06C 1/387 | D6/350 |
| 4,236,599 | A * | 12/1980 | Luff | A47C 13/00 | 269/244 |
| 4,320,817 | A * | 3/1982 | Knoke | A47C 12/02 | 297/59 |
| 4,485,892 | A * | 12/1984 | Maloney | E06C 1/393 | 182/162 |
| 4,503,932 | A * | 3/1985 | Hilton | E06C 7/14 | 182/113 |
| D335,966 | S * | 6/1993 | Schwartzkopf | D6/350 | |
| 5,582,268 | A * | 12/1996 | Heberlein | E06C 1/393 | 182/115 |
| 5,722,507 | A * | 3/1998 | Kain | E06C 1/393 | 182/104 |

(Continued)

FOREIGN PATENT DOCUMENTS

| | | | | |
|---|---|---|---|---|
| CN | 106522819 | A * | 3/2017 | |
| CN | 108825114 | A * | 11/2018 | E06C 1/18 |

(Continued)

OTHER PUBLICATIONS

PCT International Search Report and Written Opinion completed by the ISA/KR on Sep. 13, 2021 and issued in connection with PCT/US2021/035943.

(Continued)

*Primary Examiner* — Brian D Mattei
*Assistant Examiner* — Kathleen M. McFarland
(74) *Attorney, Agent, or Firm* — Barnes & Thornburg

(57) ABSTRACT

The present disclosure relates to a step stool, and particularly to a foldable step stool. More particularly, the present disclosure relates to a foldable step stool that can be collapsed to save storage space when the foldable step stool is not in use.

13 Claims, 11 Drawing Sheets

(56) References Cited

U.S. PATENT DOCUMENTS

| | | | | | | |
|---|---|---|---|---|---|---|
| 5,967,260 | A | * | 10/1999 | Spak | E06C 1/393 | 182/228.3 |
| 5,992,567 | A | * | 11/1999 | Chiu | E06C 1/387 | 182/161 |
| 6,012,548 | A | * | 1/2000 | Kim | E06C 1/393 | 182/161 |
| 6,026,933 | A | * | 2/2000 | King | E06C 1/393 | 182/161 |
| 6,039,149 | A | * | 3/2000 | Bedja | E06C 1/397 | 182/20 |
| D444,574 | S | * | 7/2001 | Gibson | D25/65 | |
| D447,572 | S | * | 9/2001 | Rosko | D25/65 | |
| 6,390,238 | B1 | * | 5/2002 | Gibson | E06C 1/387 | 182/161 |
| 6,427,805 | B1 | * | 8/2002 | Gibson | E06C 1/387 | 182/165 |
| 6,450,290 | B1 | * | 9/2002 | Spak | E06C 1/393 | D25/64 |
| 6,454,050 | B2 | * | 9/2002 | Gibson | E06C 1/393 | 182/161 |
| D465,289 | S | * | 11/2002 | Gibson | D25/64 | |
| 6,550,579 | B2 | * | 4/2003 | Gibson | E06C 1/387 | 182/161 |
| 6,902,035 | B2 | * | 6/2005 | Baumgartner | E06C 1/393 | 182/165 |
| 6,966,404 | B2 | * | 11/2005 | Meeker | A47C 13/00 | 108/132 |
| 7,100,739 | B2 | * | 9/2006 | Parker | E06C 1/393 | 182/163 |
| 7,104,361 | B2 | * | 9/2006 | Walsh | E06C 7/14 | 182/115 |
| 7,128,187 | B2 | * | 10/2006 | Simpson | E06C 7/14 | 182/129 |
| 7,182,176 | B2 | * | 2/2007 | Gibson | E06C 1/387 | 182/162 |
| 7,188,706 | B2 | * | 3/2007 | Simpson | E06C 1/393 | 182/129 |
| D553,370 | S | * | 10/2007 | Meyers | D6/350 | |
| D558,473 | S | * | 1/2008 | Mendenhall | D6/349 | |
| D562,991 | S | * | 2/2008 | Meyers | D25/65 | |
| D565,745 | S | * | 4/2008 | Meyers | D25/65 | |
| 7,383,920 | B2 | * | 6/2008 | Meeker | E06C 7/14 | 182/129 |
| 7,716,757 | B2 | * | 5/2010 | Sumpton | A47K 17/028 | 182/35 |
| 7,963,369 | B2 | * | 6/2011 | Parker | E06C 1/39 | 182/180.1 |
| 7,984,790 | B2 | * | 7/2011 | Meyers | E06C 1/393 | 182/163 |
| 8,002,084 | B2 | * | 8/2011 | Huang | E06C 7/46 | 182/180.1 |
| 8,127,890 | B2 | * | 3/2012 | Meyers | E06C 1/397 | 182/20 |
| 8,146,710 | B2 | * | 4/2012 | Moldthan | E06C 1/393 | 182/180.1 |
| 8,997,931 | B2 | * | 4/2015 | Parker | E06C 1/387 | 182/180.1 |
| 9,707,678 | B2 | * | 7/2017 | Lampe | B25H 1/06 | |
| 10,138,679 | B2 | * | 11/2018 | Russell | E06C 7/185 | |
| 10,167,668 | B1 | * | 1/2019 | Wang | E06C 1/16 | |
| 10,837,229 | B2 | * | 11/2020 | Yoo | E06C 7/182 | |
| 10,876,356 | B2 | * | 12/2020 | Russell | E06C 1/383 | |
| 10,941,616 | B2 | * | 3/2021 | Woodward | E06C 1/387 | |
| 11,225,833 | B2 | * | 1/2022 | Yoo | E06C 1/393 | |
| 11,753,868 | B2 | * | 9/2023 | Boyer | E06C 7/182 | 182/106 |
| 2005/0029050 | A1 | * | 2/2005 | Baumgartner | E06C 1/393 | 182/165 |
| 2005/0056233 | A1 | * | 3/2005 | O'Leary | E06C 7/081 | 119/753 |
| 2005/0056489 | A1 | * | 3/2005 | Walsh | E06C 7/185 | 182/156 |
| 2005/0252721 | A1 | * | 11/2005 | Parker | E06C 1/005 | 182/165 |
| 2005/0284701 | A1 | * | 12/2005 | Gibson | E06C 7/14 | 182/165 |
| 2006/0070808 | A1 | * | 4/2006 | Moldthan | E06C 1/393 | 182/180.1 |
| 2006/0150315 | A1 | * | 7/2006 | Sumpton | E06C 1/005 | 4/621 |
| 2006/0266585 | A1 | * | 11/2006 | Simpson | E06C 7/14 | 182/129 |
| 2007/0284192 | A1 | * | 12/2007 | Meyers | A47C 12/00 | 182/129 |
| 2008/0179138 | A1 | * | 7/2008 | Parker | E06C 1/393 | 182/106 |
| 2008/0251319 | A1 | * | 10/2008 | Meyers | E06C 1/397 | 182/152 |
| 2010/0236866 | A1 | * | 9/2010 | Huang | E06C 1/18 | 182/159 |
| 2011/0024234 | A1 | * | 2/2011 | Lin | E06C 1/387 | 182/161 |
| 2011/0209946 | A1 | * | 9/2011 | Leng | E06C 1/393 | 182/129 |
| 2014/0190769 | A1 | * | 7/2014 | Parker | E06C 1/393 | 182/159 |
| 2015/0008071 | A1 | * | 1/2015 | Lampe | E06C 7/50 | 182/129 |
| 2017/0226803 | A1 | * | 8/2017 | Russell | E06C 7/185 | |
| 2018/0347278 | A1 | * | 12/2018 | Russell | E06C 1/383 | |
| 2018/0363374 | A1 | * | 12/2018 | Woodward | E06C 1/393 | |
| 2019/0330920 | A1 | * | 10/2019 | Boyer | E06C 1/383 | |
| 2020/0063493 | A1 | * | 2/2020 | Yoo | E06C 7/182 | |
| 2020/0325726 | A1 | * | 10/2020 | Yoo | E06C 1/18 | |
| 2021/0010327 | A1 | * | 1/2021 | Boyer | E06C 1/393 | |
| 2021/0037989 | A1 | * | 2/2021 | Rogers | A47D 1/04 | |
| 2021/0378405 | A1 | * | 12/2021 | Boyer | A47C 12/00 | |

FOREIGN PATENT DOCUMENTS

| | | | | | |
|---|---|---|---|---|---|
| DE | 8902988 | U1 | | 8/1990 | |
| DE | 202008000020 | U1 | * | 9/2009 | E06C 1/387 |
| DE | 202014100556 | U1 | * | 4/2014 | A47C 12/00 |
| DE | 202017100664 | U1 | * | 4/2017 | E06C 1/387 |
| EP | 1914378 | A1 | * | 4/2008 | E06C 1/12 |
| EP | 2090740 | A1 | * | 8/2009 | E06C 1/393 |
| GB | 2029884 | A | * | 3/1980 | A47C 12/00 |
| WO | WO-2016209646 | A1 | * | 12/2016 | A47C 12/00 |

OTHER PUBLICATIONS

European Patent Office Search Report for Application No. EP21816953, dated May 23, 2024, 9 pages.

* cited by examiner

KITCHEN HELPER FOLDING STEP STOOL

PRIORITY CLAIM

This application claims priority under 35 U.S.C. § 119(e) to U.S. Provisional Application Ser. No. 63/034,718, filed Jun. 4, 2020, which is expressly incorporated by reference herein.

BACKGROUND

The present disclosure relates to a step stool, and particularly to a foldable step stool. More particularly, the present disclosure relates to a foldable step stool that can be collapsed to save storage space when the foldable step stool is not in use.

SUMMARY

A foldable step stool according to the present disclosure is movable from an expanded use position to a collapsed storage position. In the expanded use position, a platform panel is supported above the ground in a first horizontal plane so that a user may stand on the platform panel. In the collapsed storage position, platform panel is moved out of the first horizontal plane to reduce the footprint of the foldable step stool and save space when the foldable step stool is not in use.

In illustrative embodiments, the foldable step stool includes a step unit with rear legs and a lower step, a step unit stabilizer with front legs, and a platform unit with the platform step panel being supported by the rear legs and the front legs when the foldable step stool is in the expanded use position. The step unit stabilizer may also include a three-sided platform surround rail that is above the platform panel in a second horizontal plane so that a user may be surrounded on three sides when standing on the platform panel. The three-sided platform surround rail includes a front handle portion that extends along a front side edge of the platform panel and side portions that extend along side edges of the platform panel.

In illustrative embodiments, the foldable step stool may further include a rear crossbar movable from an entry position extending along one of the rear legs of the step unit to a retention position extending between the rear legs of the step unit along a rear side edge of the platform panel. When in the retention position, the rear crossbar cooperates with the three-sided platform surround rail so that a user may be surrounded on all four sides when standing on the platform panel.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a foldable step stool that is reconfigurable from an expanded use configuration, illustrated in FIG. 3, to a collapsed storage configuration, illustrated in FIG. 14, showing that the foldable step stool includes a step unit with a lower short step, rear legs, and a rear pivoting crossbar, a stabilizer unit with front legs, a u-shaped handle rail, and guide links, and a platform unit supported by the step unit and the stabilizer unit when the foldable step stool is in the expanded use configuration;

FIG. 2 is an exploded perspective view of the foldable step stool of FIG. 1 showing that step unit further includes a pivotable bar that extends between the rear legs at a mid-height of the rear legs, the stabilizer unit includes a platform support bar that extends between the front legs at a mid-height of the front legs, and the platform unit includes a platform step panel that is supported by the pivotable bar of the step unit and the platform support bar of the stabilizer unit in the expanded use configuration, a platform latch that hooks around the platform support bar when the foldable step stool is in the expanded use configuration, platform links that guide the motion of the platform step panel when the foldable step stool is folded from the expanded use configuration to the collapsed storage configuration, and platform collars that allow the platform step panel to be pivotably mounted to the pivotable bar of the step unit;

FIG. 3 is a perspective view of the foldable step stool of FIG. 1 showing the rear pivoting crossbar locked in the horizontal safe position at the top of the rear legs to prevent a child from falling backward and off the foldable step stool when the child is stood on the platform step panel as shown in FIG. 20, the rear pivoting crossbar including a crossbar latch that locks to a crossbar latch pin on the left rear leg and a crossbar axis that allows the rear pivoting crossbar to pivot around the crossbar axis to move into a stored position, illustrated in FIG. 8;

Figure 1:
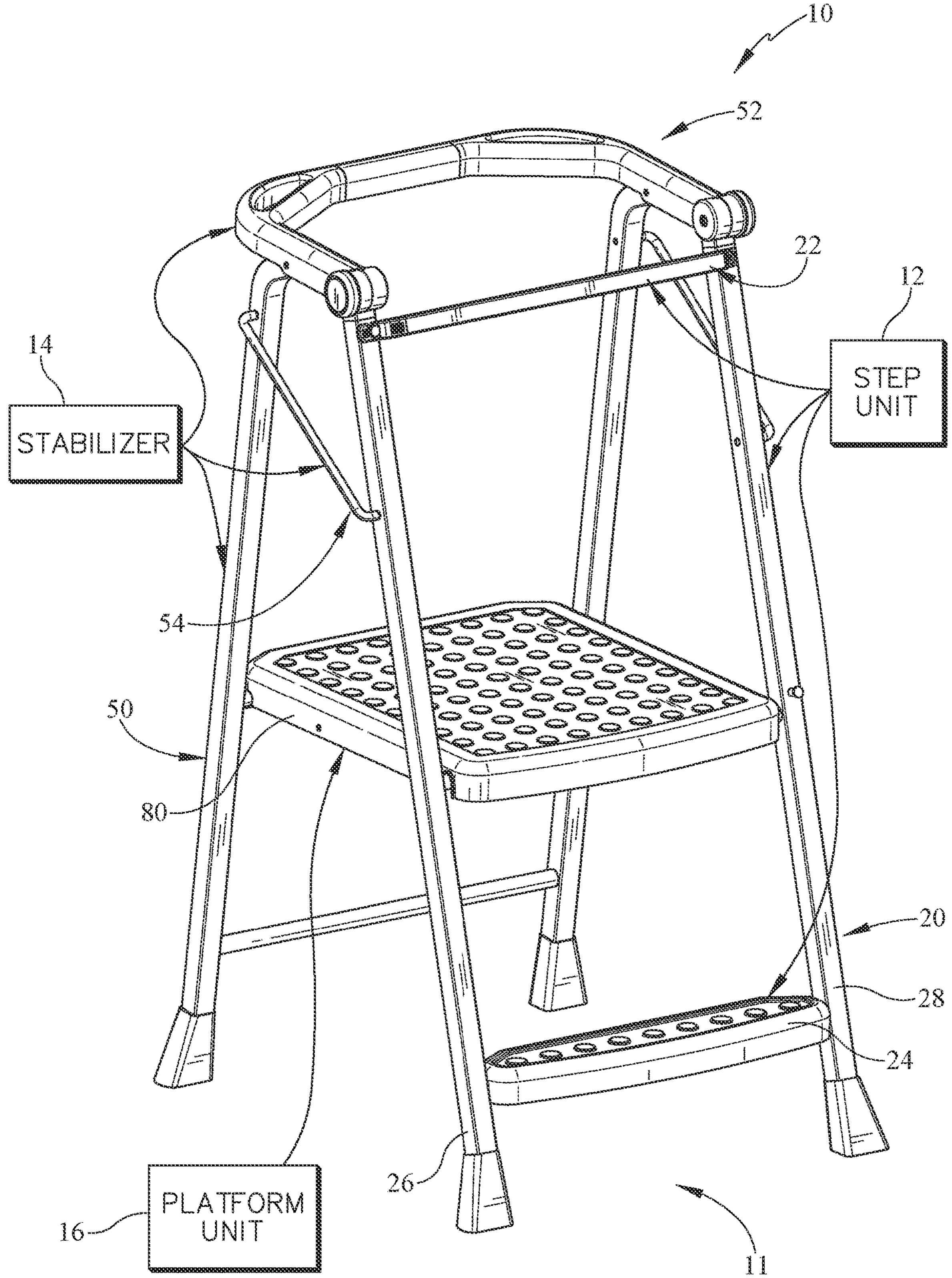
Figure 8:
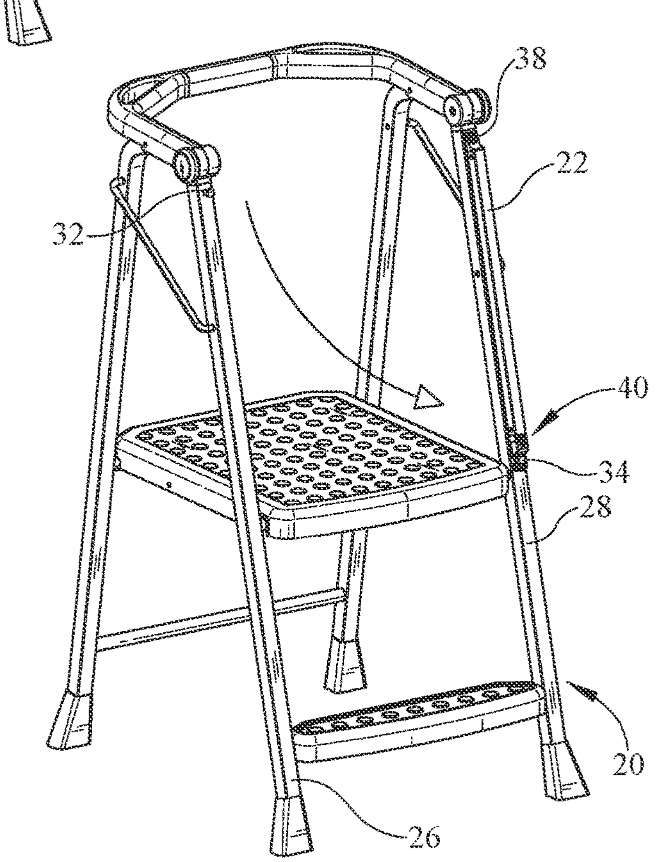
Figure 9:
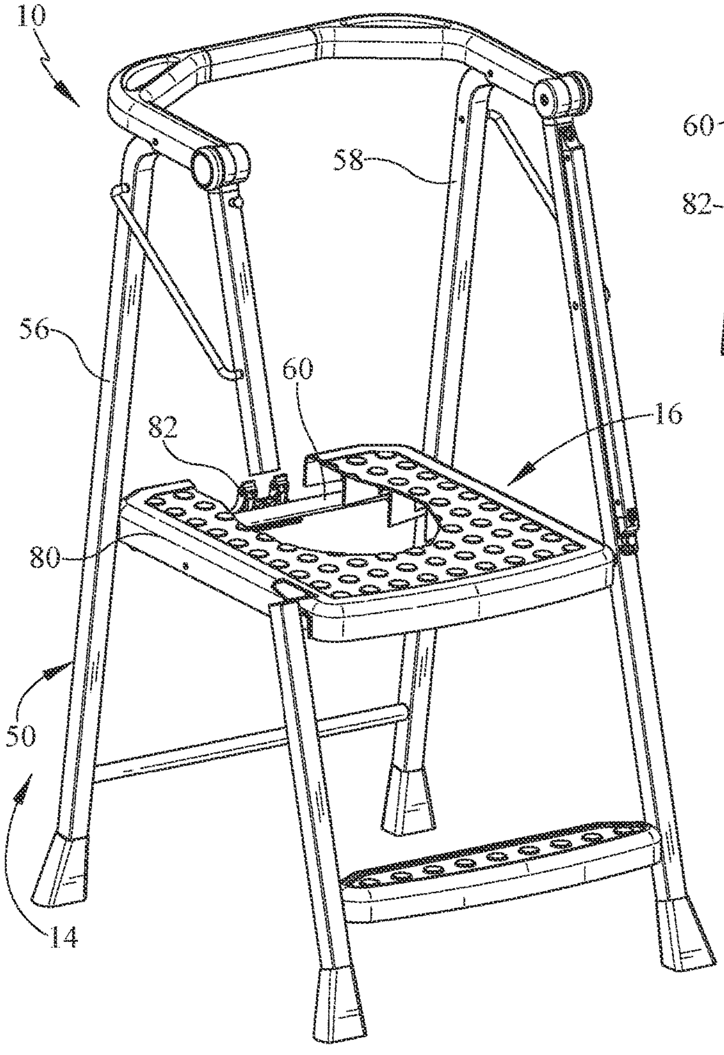
Figure 10:
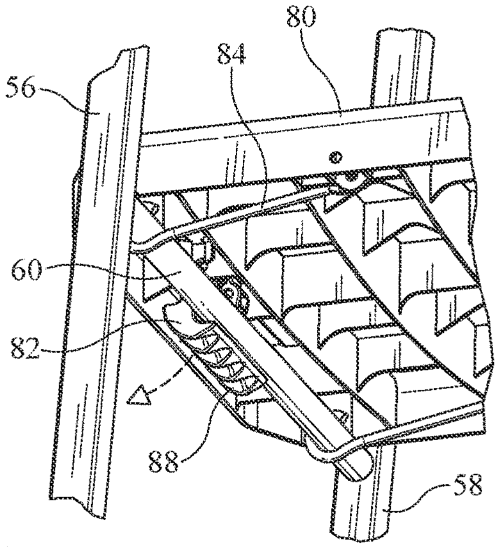
Figure 11:
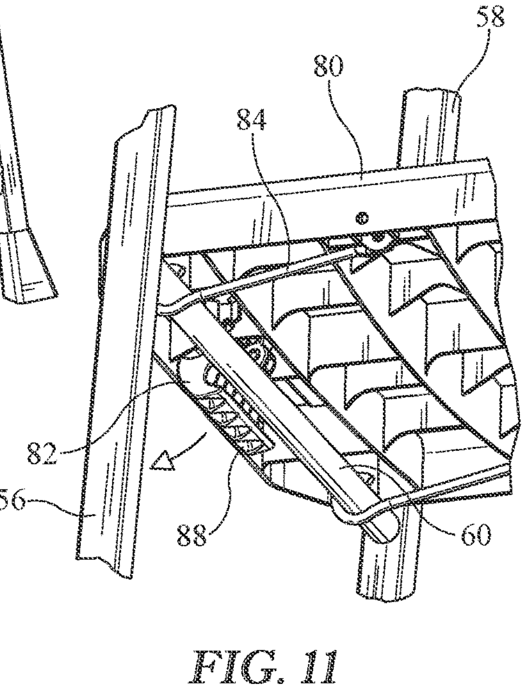
Figure 12:
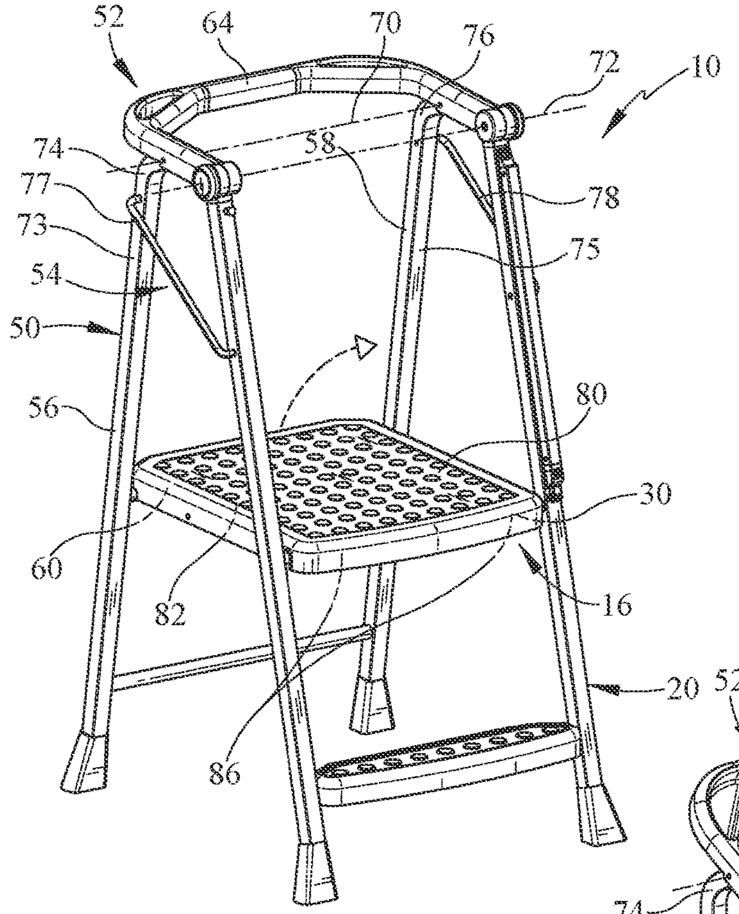
Figure 13:
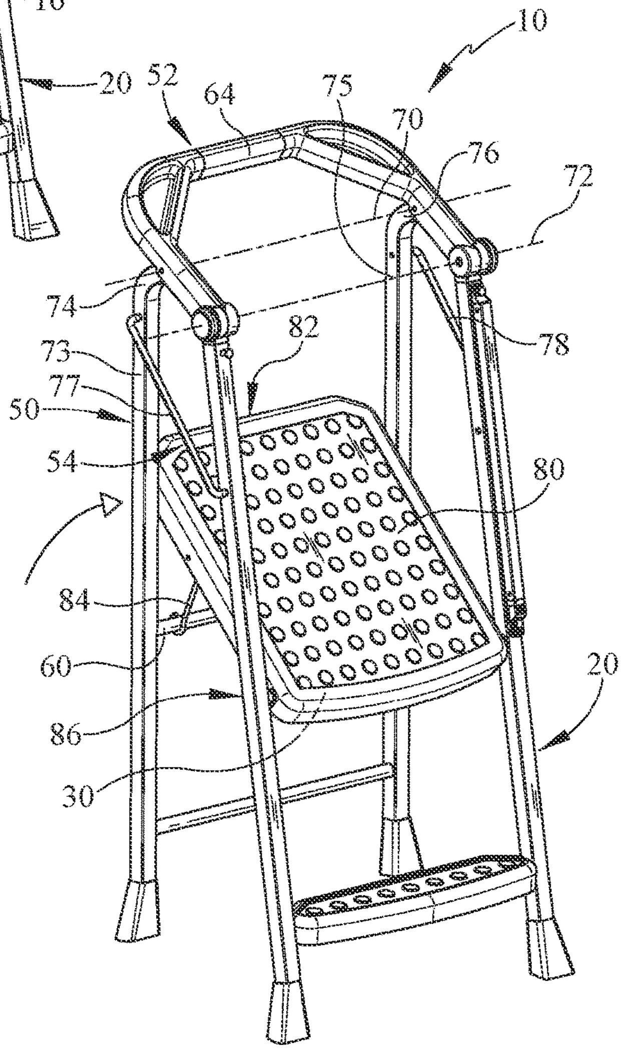
Figure 14:
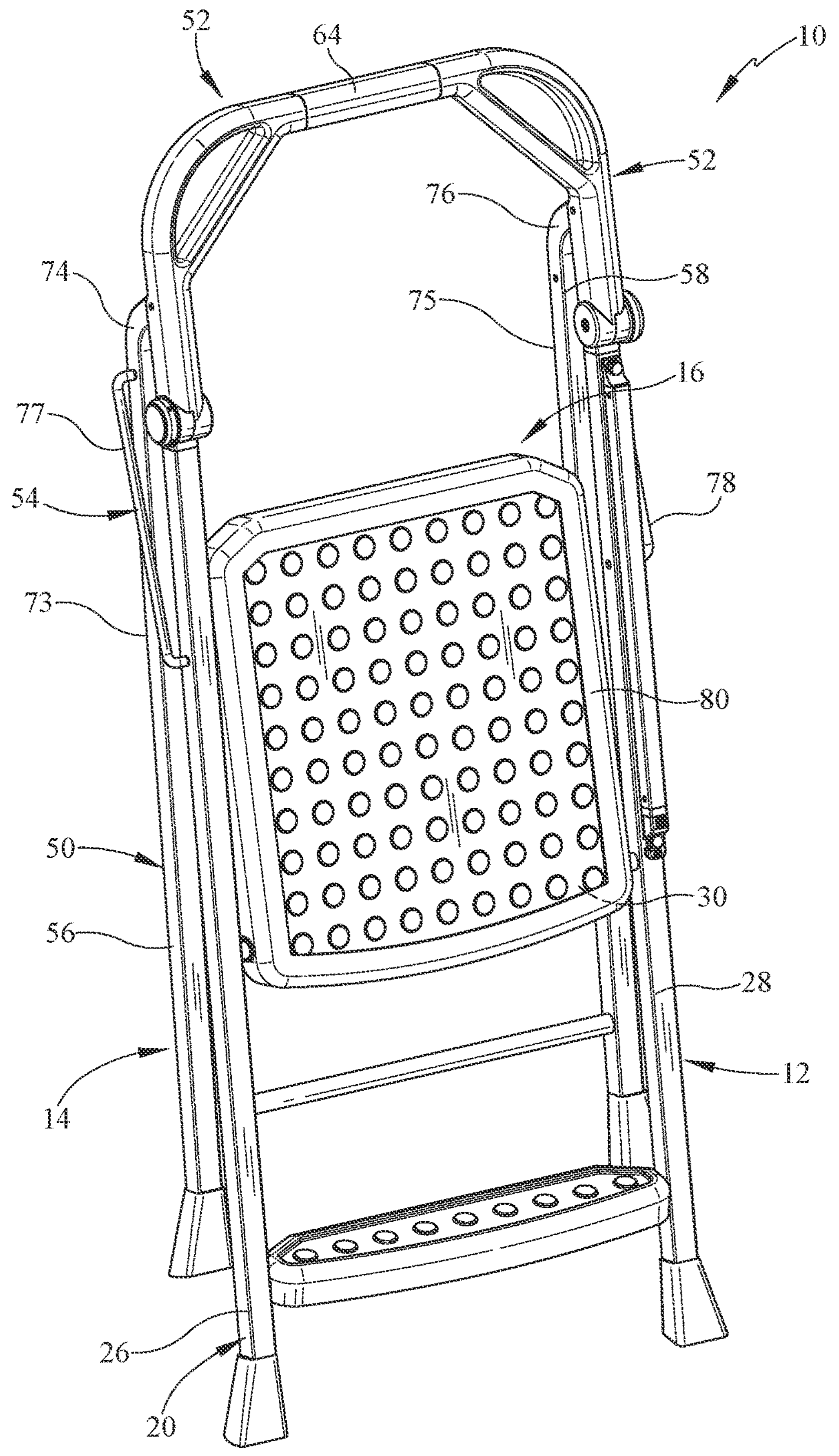
Figure 15A:
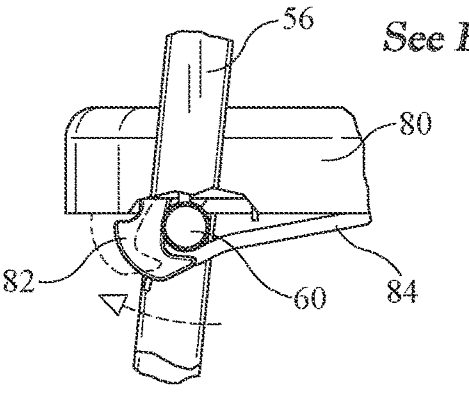
Figure 15:
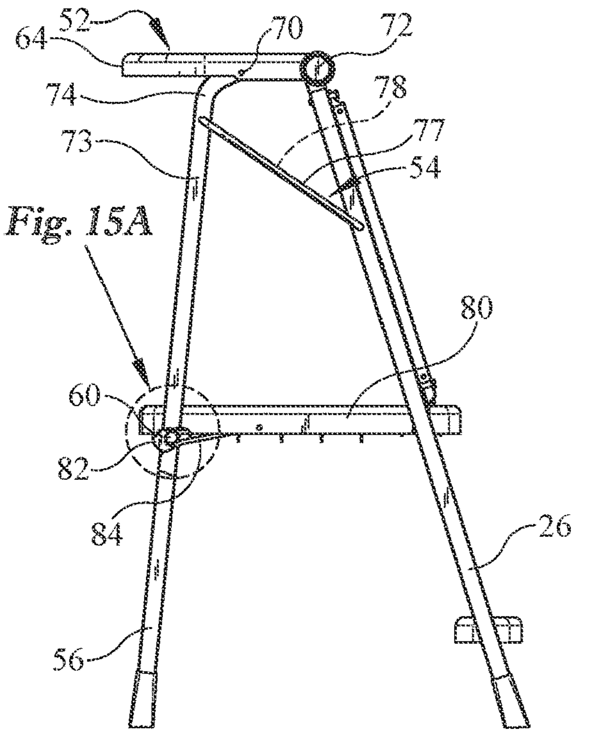
Figure 16:
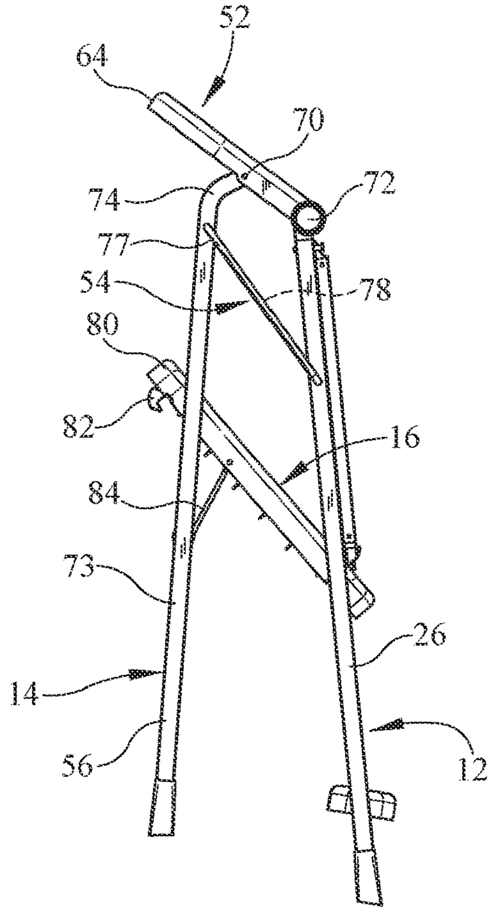
Figure 17:
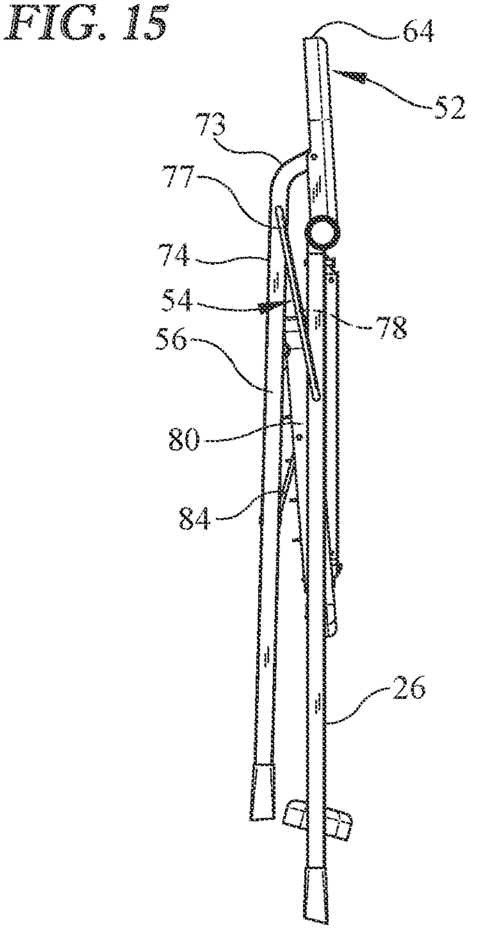
Figure 18:
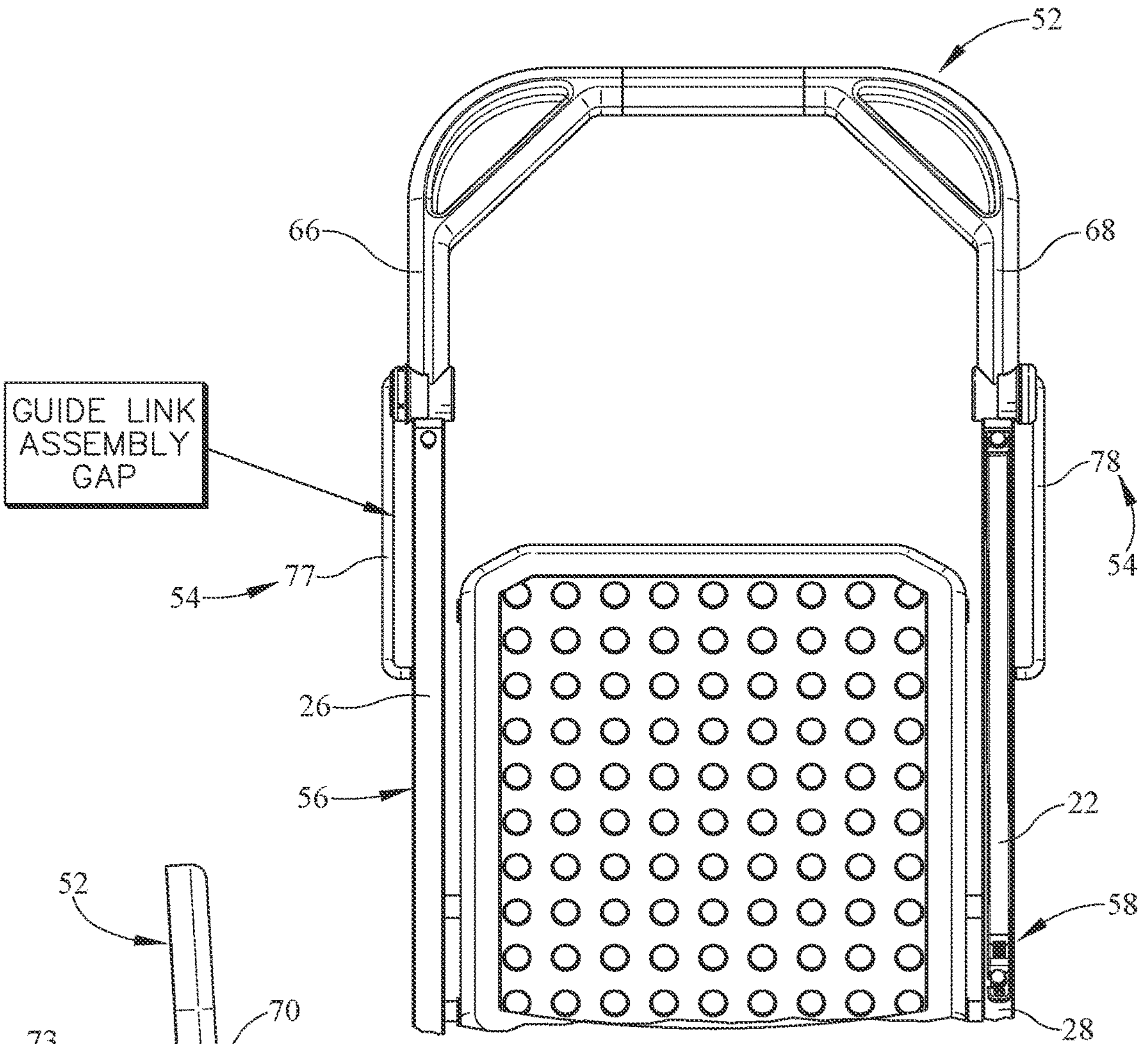
Figure 19:
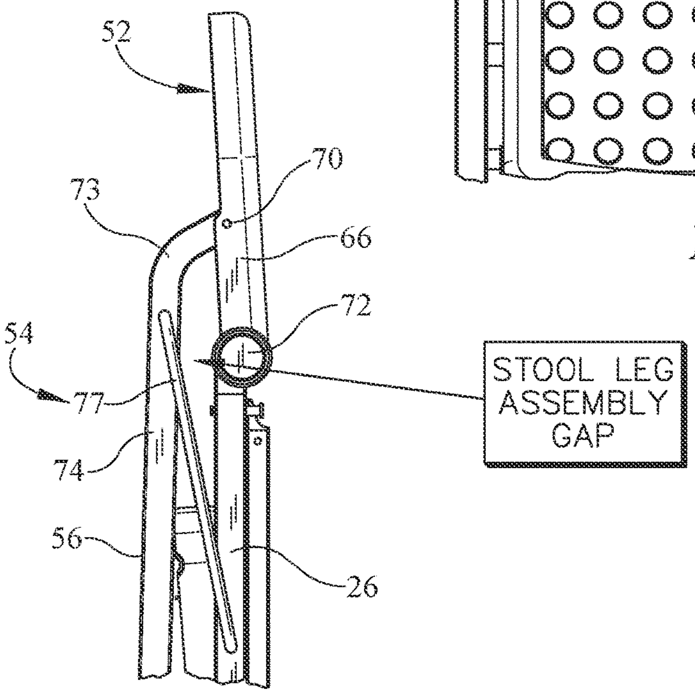
Figure 20:
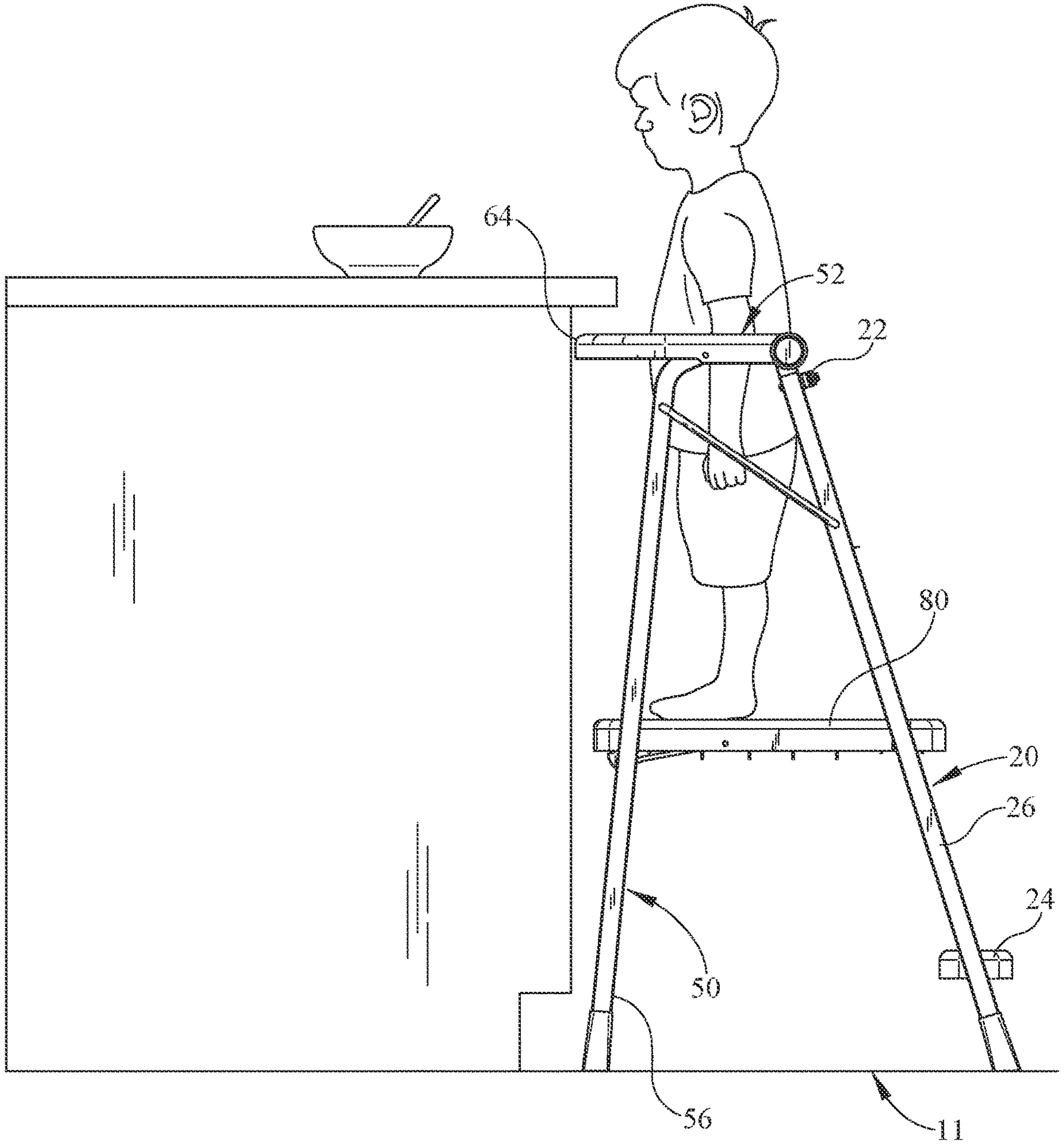
Figure 21:
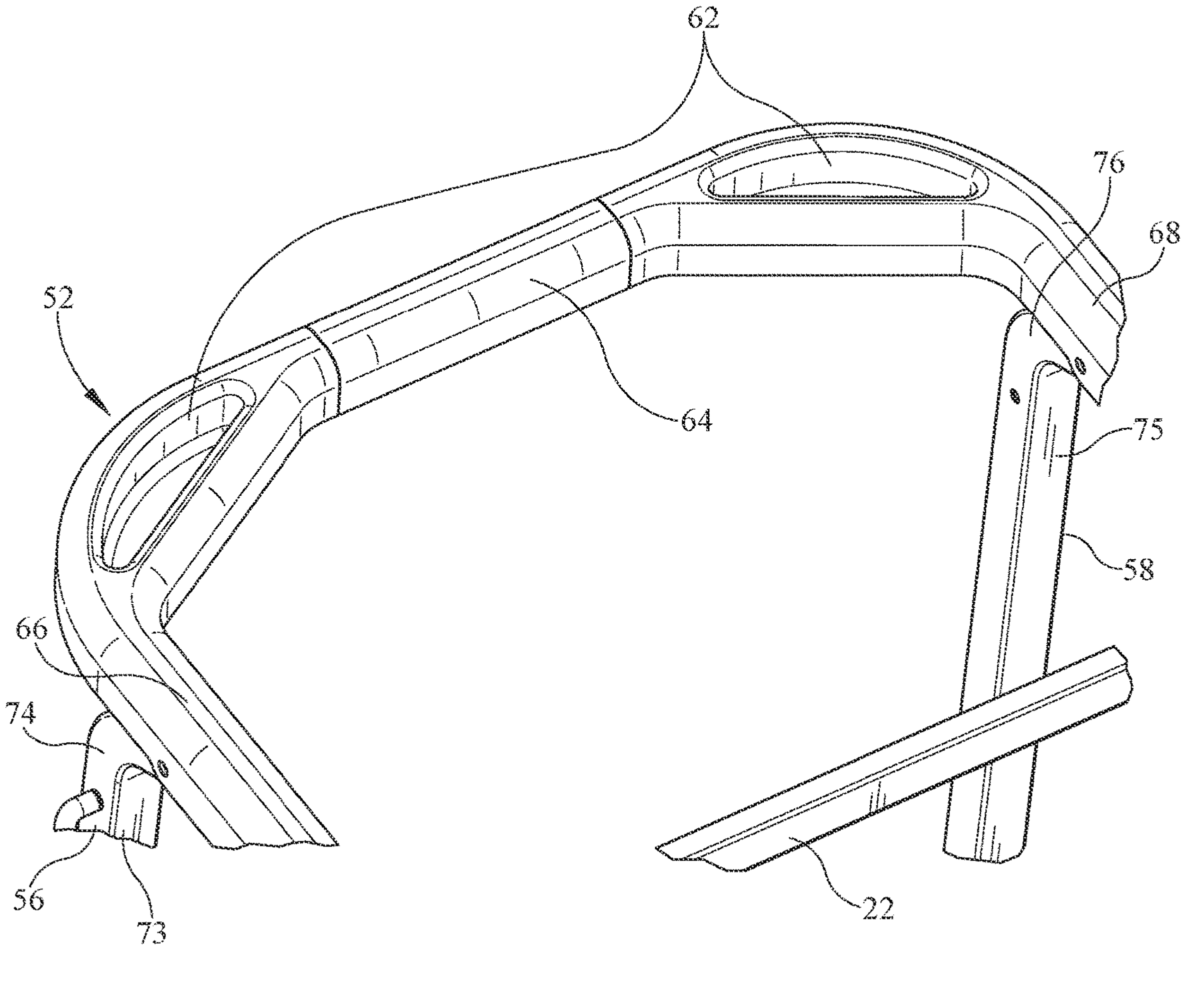

FIG. 8 is a perspective view of the foldable step stool of FIG. 1 showing the rear pivoting crossbar pivots around the crossbar axis at the top of the right rear leg so that the rear pivoting cross bar can swing from the horizontal safe position to an entry position so that the rear pivoting crossbar aligns with the right rear leg and is secured in position by the crossbar latch attaching to a retention pin;

FIG. 9 is a cutaway perspective view of the foldable step stool of FIG. 8 showing the platform latch extends downwardly from a front end of the platform step panel, and the platform latch extends around the platform support bar of the stabilizer unit to prevent the foldable step stool from moving out of the expanded use configuration;

FIG. 10 is a detailed perspective view of the underside of the platform unit of FIG. 9 showing the platform latch in the locked position, and further showing the platform latch has a curved handgrip portion that extends forward of the platform support bar and then rearward and underneath the platform support bar so that the platform step panel is secured to the platform support bar and the foldable step stool is locked in the expanded use configuration;

FIG. 11 is a detailed perspective view of the underside of the platform unit of FIG. 9 showing the platform latch in the open position where a user can rotate the platform latch forward away from the platform support bar, allowing the platform step panel to move upward away from the platform support bar as illustrated in FIG. 13;

FIG. 12 is a perspective view of the foldable step stool of FIG. 9 showing that when the platform latch in the open position a user can begin folding the foldable step stool by pulling a front end of the platform step panel upward and rearward to begin the folding process;

FIG. 13 is a perspective view of the foldable step stool of FIG. 12 showing the foldable step stool moving from the expanded use configuration toward the collapsed storage configuration of FIG. 14 and further showing the platform step panel pivots around the pivotable bar of the step unit and the platform links connect the platform step panel to the platform support bar to guide the stabilizer unit toward the step unit as the platform step panel is pulled into a vertical position;

FIG. 14 is a perspective view of the foldable step stool of FIG. 13 showing the foldable step stool in the collapsed storage configuration;

FIG. 15 is a side elevation view of the foldable step stool of FIG. 1 in the expanded use configuration showing the lower short step supported in a first horizontal plane, the platform step panel supported in a second horizontal plane above the first horizontal plane, and the U-shaped handle rail supported in a third horizontal plane above the second horizontal plane when the foldable step stool is in the expanded use configuration, and further showing a cutaway portion of the stabilizer unit showing the platform latch in the locked position around the platform support bar;

FIG. 15A is a detailed cutaway view of the foldable step stool showing the platform latch in the locked position around the platform support bar and showing the translated path of the platform latch pivoting forward and upward away from the platform support bar so that the platform step panel becomes decupled from the platform support bar of the stabilizer unit;

FIG. 16 is a side elevation view of the foldable step stool of FIG. 15 showing the foldable step stool moving from the expanded use configuration of FIG. 15 toward the collapsed storage configuration of FIG. 16;

FIG. 17 is a side elevation view of the foldable step stool of FIG. 15 showing the foldable step stool in the collapsed storage configuration;

FIG. 18 is a rear elevation view of the foldable step stool of FIG. 14 showing when the foldable step stool is in the collapse storage configuration a guide link assembly gap exists between the guide links and the front legs of the stabilizer unit and the rear legs of the step unit to prevent a user from trapping their hands between the step stool assembly components when the step stool is moved from the of the expanded use configuration to the collapsed storage configuration;

FIG. 19 is a side elevation view of the foldable step stool of FIG. 14 showing when the foldable step stool is in the collapse storage configuration a stool leg assembly gap exists between the front legs of stabilizer unit and the rear legs of the step unit to prevent a user from trapping their hands between the step stool legs when the step stool is moved from the of the expanded use configuration to the collapsed storage configuration;

FIG. 20 is a side elevation view of the foldable step stool of FIGS. 1-19 showing the foldable step stool in the expanded use configuration adjacent to a kitchen counter so that the front handle portion of the U-shaped handle, the front of the platform step panel, and the front legs are all in close proximity to the kitchen counter to allow a child to be within reach of items on the kitchen counter when the child is stood on the platform step panel, and the rear pivoting cross bar is in the horizontal safe position to prevent the child from falling backwards and off the foldable step stool; and FIG. 21 is perspective view of the foldable step stool of FIGS. 1-20 showing the U-shaped handle rail includes handle pockets between the front handle portion and the left and right handle portions, and the handle pockets are horizontally orientated in the expanded use configuration so that a child can fill the pockets with food or toys when the child is using the foldable step stool.

DETAILED DESCRIPTION

A foldable step stool 10 provides support for a user above ground 11 as suggested in FIG. 1. The foldable step stool 10 is reconfigurable from an expanded use configuration to a collapsed storage position as shown in FIGS. 3-14. The expanded use configuration provides a platform step panel 80 in a horizontal orientation to support a user in an elevated position above the ground 11 as shown in FIG. 20. In the collapsed storage position the platform step panel 80 is moved along with other components of the foldable step stool 10 to reduce the footprint of the foldable step stool 10 to save space when the foldable step stool is not in use.

The expanded use configuration of the foldable step stool 10 provides a stable structure with parallelogram shape when viewed from a side elevation formed by a front frame 50, a rear frame 20, and a u-shaped handle rail 52 as shown in FIG. 15. In the expanded use configuration the U-shaped handle rail 52, the platform step panel 80, and the lower short step 24 all have horizontal orientation to make it easier for a user to climb on and off the foldable step stool 10 and support themselves when stood on the foldable step stool 10.

The collapsed storage position of the foldable step stool 10 moves the u-shaped handle rail 52, the rear frame 20, the front frame 50, and the platform step panel 80 into an approximately vertical orientation so that the foldable step stool has a smaller footprint as shown in FIGS. 14 and 17. The rear frame 20 and the front frame 50 are spaced apart in the collapsed storage position to create a stool leg assembly gap that prevents a user trapping their fingers between the front and rear frames 50, 20 as shown in FIG. 19. Guide link 54 that couple the front frame 50 and the rear frame 20 are also configured to be spaced apart from the sides of the front frame 50 and the rear frame 20 to create a guide link assembly gap that prevents a user trapping their fingers as shown in FIG. 18.

The platform step panel 80 is support by a platform support bar 60 on the front frame 50 and a pivotable bar 30 on the rear frame 20. A platform latch 82 is pivotably coupled to the front of the platform step panel 80 and extends downward and around the platform support bar 60 on the front frame 50 in a locked position. When the platform latch 82 is in the locked position it prevents the platform step panel 80 from being decoupled from the platform support bar 60 so that the foldable step stool is locked in the expanded use configuration. A user may rotate the platform latch 82 forward relative to the platform step panel 80 into an unlocked position so that the platform latch 82 no longer extends around the platform support bar 60. When the platform latch 82 is in the unlocked position, a user may pull upward on the platform latch 82 to decouple the platform step panel 80 from the platform support bar 60 to allow the foldable step stool 10 to be moved into the collapsed storage position.

The foldable step stool illustratively includes a step unit 12, a stabilizer unit 14, and a platform unit 16 as shown in FIG. 1. The platform unit 16 is supported above the ground 11 by the step unit 12 and the stabilizer unit 14 when the foldable step stool 10 in the in the expanded use configuration. The platform unit 16 is pivotably coupled to the step unit 12 and detachably coupled with the platform latch 82 to the stabilizer unit 14. The step unit 12 is pivotably coupled to the stabilizer unit 14 at a top end of the step unit 12 and located aft of the stabilizer unit 14 when the foldable step stool is in the expandable use configuration and positioned near a kitchen counter or similar elevated surface.

Figure 2:
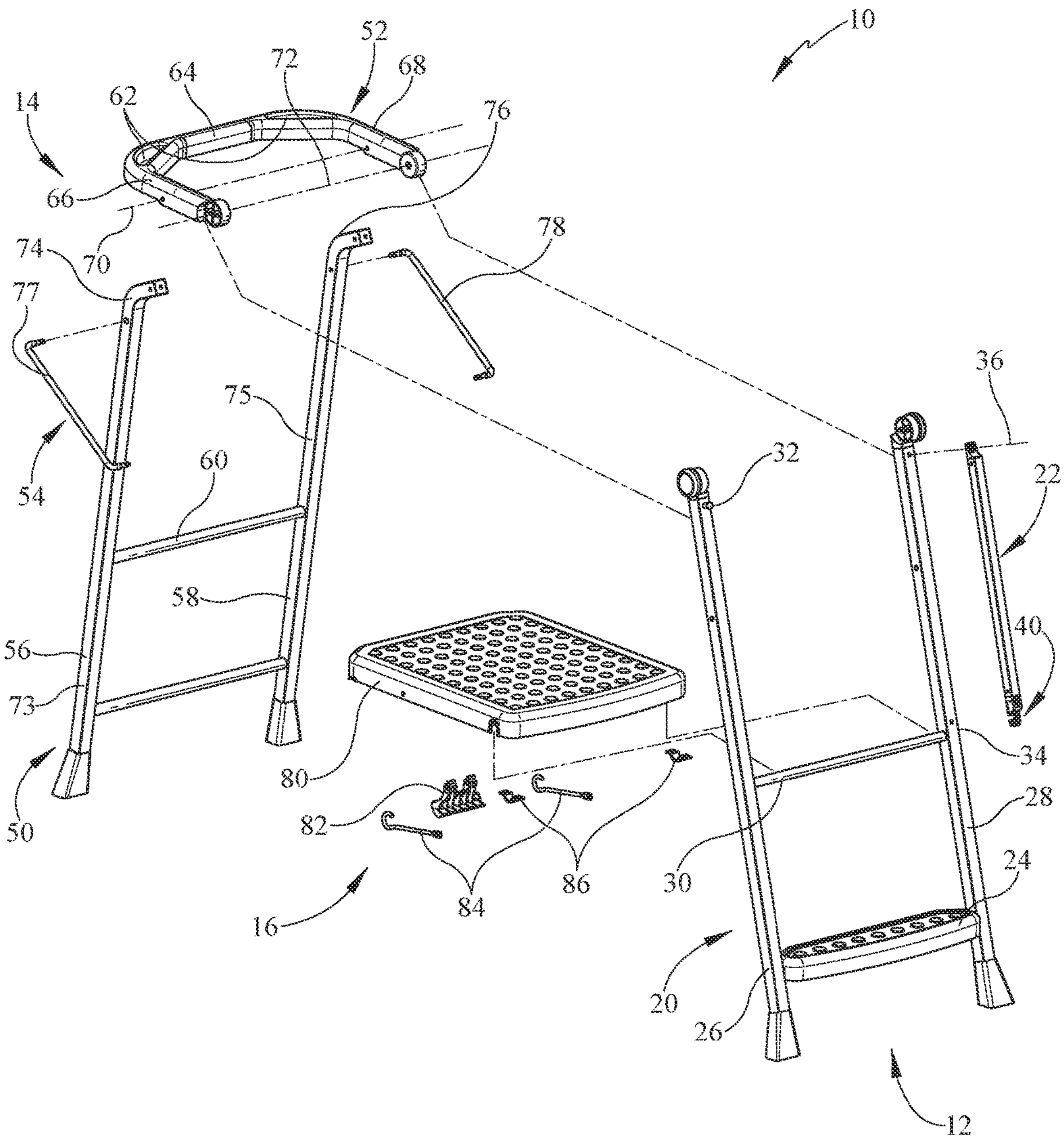

The step unit 12 includes the rear frame 20 and a rear pivoting crossbar 22 that pivotably couples to the rear frame 20 as shown in FIGS. 1 and 2. The rear frame 20 provides the entry path to the foldable step stool and includes a lower short step 24, a left rear leg 26, a right rear leg 28, and a pivotable bar 30 as shown in FIG. 2. The pivotable bar 30 and the lower short step 24 interconnect the left rear leg 26 and the right rear leg 28 together. The lower short step 24 is angled relative to the left rear leg 26 and the right rear leg 28 such that the lower short step 24 has horizontal orientation when the foldable step stool 10 is in the expanded use configuration.

The lower short step 24 is located above the ground 11 and below the pivotable bar 30 that supports the platform unit 16. The distance between the lower short step 24 and the ground 11 may be selected such that a child user may comfortably step up from the ground 11 to the lower short step 24. The distance between the lower short step 24 and the pivotable bar 30 may be selected such that a child user may comfortably step up between the lower short step 24 and the platform unit 16. In some embodiments, the rear frame 20 may include additional steps to reduce the gap between a step and the platform unit 16 to help smaller children use the foldable step stool 10.

Figure 4:
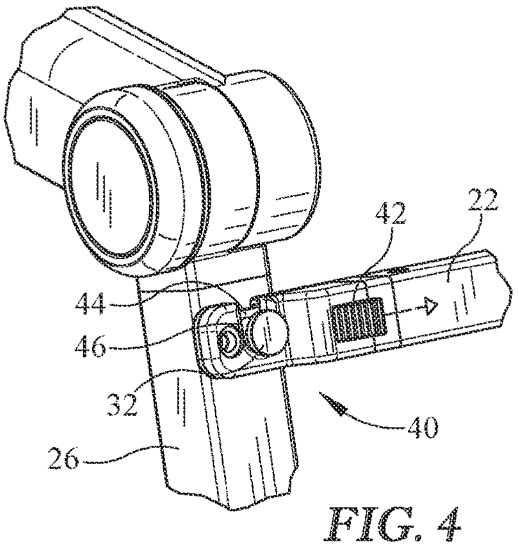
FIG. 4 is a detailed view of the crossbar latch in its locked position with the crossbar latch pin, the crossbar latch includes a moveable latch rod connected to a crossbar latch button so that when the crossbar latch is in the horizontal locked position the moveable latch rod locates above the crossbar latch pin and prevents the rear pivoting crossbar latch from moving downward.
Figure 5:
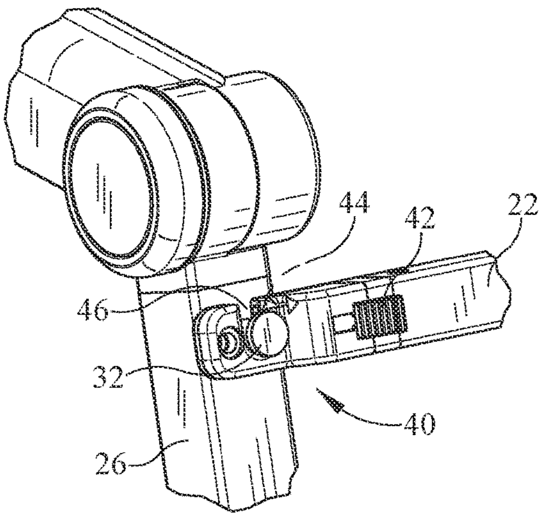
FIG. 5 is a detailed view of the crossbar latch of FIG. 4 where a user pushes the crossbar latch button away from the crossbar latch pin which also pulls the moveable latch rod away from the top of the crossbar latch pin so that the crossbar latch is in its open position and the rear pivoting crossbar is free to move downward.
Figure 6:
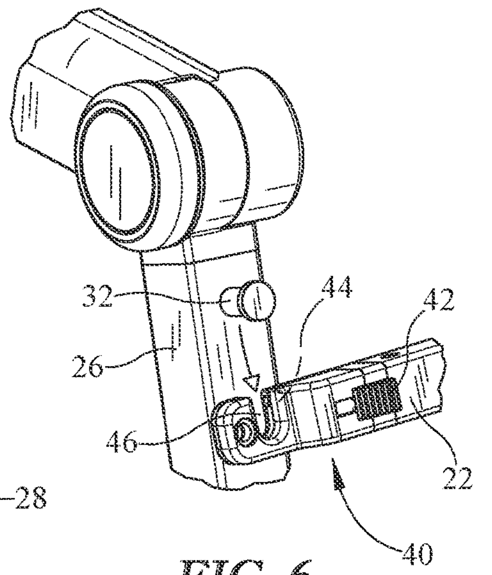
FIG. 6 is a detailed view of the cross bar latch of FIG. 5 showing that the rear pivoting crossbar in a detached position so that it can be pivoted away from the crossbar latch pin when the crossbar latch is in the open position.

The left rear leg 26 is pivotably coupled to the stabilizer unit 14 at the top of the leg and includes a foot at the base of the leg that engages the ground 11 as shown in FIG. 2. The left rear leg 26 further includes a crossbar latch pin 32 a small distance from the top of the leg. The crossbar latch pin 32 extends rearwards and perpendicular from the left rear leg 26 as shown in FIGS. 4-6. The crossbar latch pin 32 provides an attaching point for the rear pivoting crossbar 22 when the rear pivoting crossbar 22 is in the horizontal safe position. In some embodiments, the crossbar latch pin 32 may also provide riveting functions to couple a pivoting member to the top of the left rear leg 26.

Figure 3:
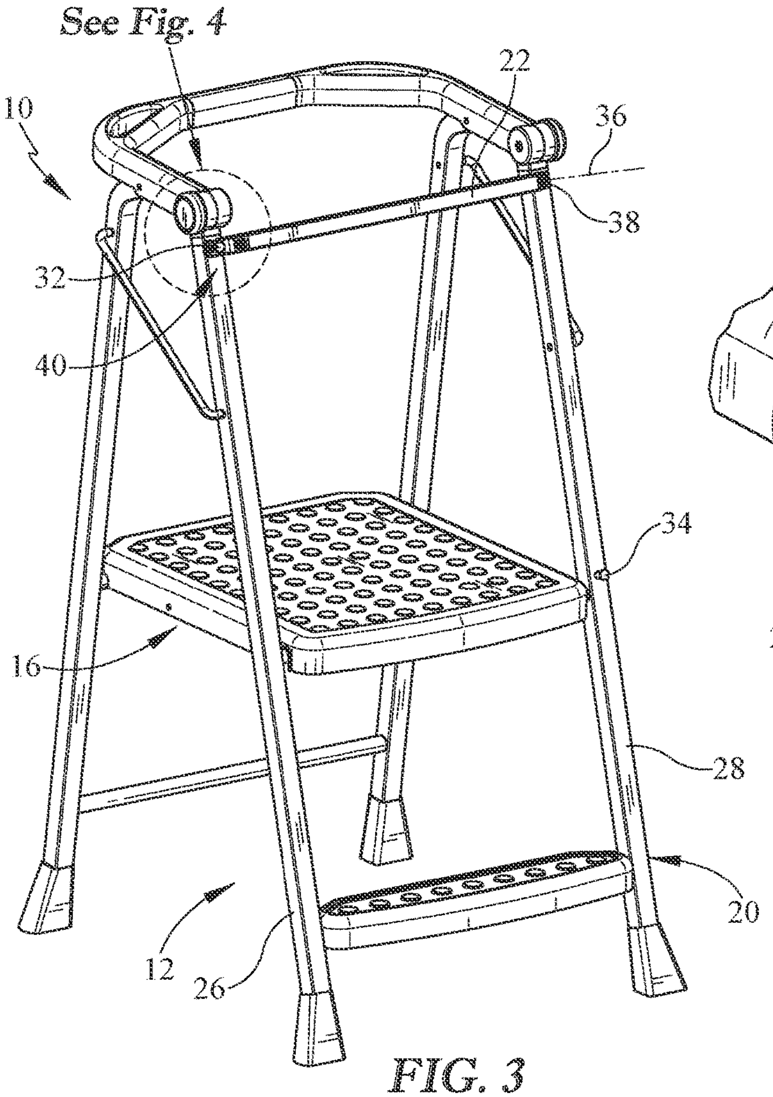
Figure 7:
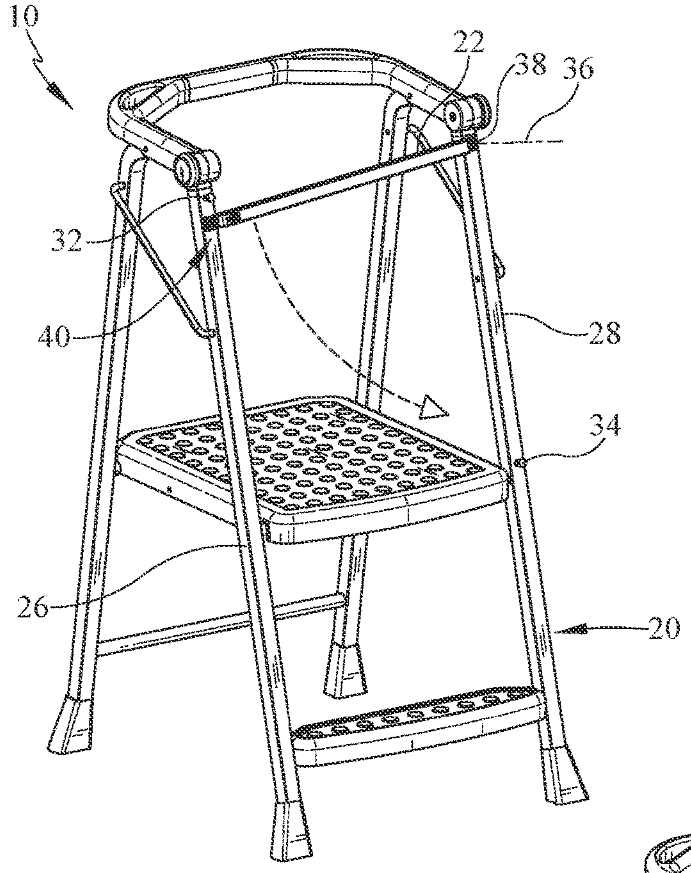
FIG. 7 is a perspective view of the foldable step stool of FIG. 1 showing the rear pivoting crossbar in its detached position as illustrated in FIG. 6.

The right rear leg 28 is pivotably coupled to the stabilizer unit 14 at the top of the leg and includes a foot at the base of the leg that engages the ground 11. The right rear leg 28 further includes a crossbar storage latch pin 34 approximately midway along the length of the right rear leg 28. The crossbar storage latch pin 34 extends rearwards and perpendicular from the right rear leg 28 as shown in FIGS. 3, 7, and 8. The crossbar storage latch pin 34 provides an attaching point for the rear pivoting crossbar 22 when the rear pivoting crossbar 22 is in the entry position.

The rear pivoting crossbar 22 is pivotably coupled to the rear frame 20 and is reconfigurable between a horizontal safe position and an entry position as shown in FIGS. 3, 7, and 8. The rear pivoting crossbar 22 includes a pivoting pin 38 at one end and a crossbar latch 40 at the opposite end. The pivoting pin 38 is pivotably coupled to the right rear leg 28 a small distance from the top of the right rear leg 28. The pivoting pin 38 allows the rear pivoting crossbar 22 to pivot around a crossbar axis 36 that extends through the pivoting pin 38 and the right rear leg 28.

The crossbar latch 40 includes a latch button 42, a latch catch 44, and a latch slot 46 as shown in FIGS. 4-6. The latch button 42 is directly connected to the latch catch 44 to move therewith, and the latch button 42 is slidably mounted to the rear pivoting crossbar 22. The latch slot 46 forms a space in the rear pivoting crossbar 22 that slideably receives one of the crossbar latch pin 32 or the crossbar storage latch pin 34. The latch catch 44 extends across the top of the latch slot 46 in a closed position to couple the rear pivoting crossbar 22 to one of the crossbar latch pin 32 or the crossbar storage latch pin 34. When a user slides the latch button 42 towards the pivoting pin 38, the latch catch 44 moves with the latch button 42 towards the pivoting pin 38 into an open position that opens the latch slot 46 so that the rear pivoting crossbar 22 can be slideably detached from one of the crossbar latch pin 32 or the crossbar storage latch pin 34. The latch button 42 and latch catch 44 is biased to the closed position with a spring.

The crossbar latch 40 allows the rear pivoting crossbar 22 to detachable couple to the crossbar latch pin 32 when the rear pivoting crossbar 22 is in the horizontal safe position. The crossbar latch 40 also allows the rear pivoting crossbar 22 to detachable couple to the crossbar storage latch pin 34 when the rear pivoting crossbar 22 is in the entry position. In the horizontal safe position, the rear pivoting crossbar 22 extends horizontally between the pivoting pin 38 located on the right rear leg 28 to the crossbar latch pin 32 located on the left rear leg 26. In the horizontal safe position, the rear pivoting crossbar 22 prevents a user that is stood on the platform unit 16 from falling backwards and off the foldable step stool 10 as shown in FIG. 20. In the entry position, the rear pivoting crossbar 22 is in parallel alignment with the right rear leg 28, and allows a user to step on to or step off the platform unit 16.

The stabilizer unit 14 collaborates with the step unit 12 to stabilize the foldable step stool 10 when the foldable step stool 10 is in the expanded use configuration as shown in FIG. 1. The stabilizer unit 14 includes the front frame 50, the u-shaped handle rail 52, and guide links 54 as shown in FIG. 2. The front frame 50 is pivotably coupled about a front leg axis 70 to the u-shaped handle rail 52, and the u-shaped handle rail 52 is further pivotably coupled about a rear leg axis 72 to the rear frame 20. The guide links 54 interconnect the front frame 50 with the rear frame 20 to guide the movement of the front frame 50 relative to the rear frame 20 when the foldable step stool 10 is reconfigured from the expansion use configuration to the collapsed storage position.

The front frame 50 is located forward of the rear frame 20 and will typically be positioned adjacent to a kitchen counter or similar as shown in FIG. 20. The front frame 50 includes a left front leg 56, a right front leg 58, and a platform support bar 60 as shown in FIG. 2. The platform support bar 60 interconnects the left front leg 56 and the right front leg 58 together and provides support to the platform unit 16. The distance between the ground 11 and the platform support bar 60 corresponds to the selected height of the platform unit 16. The platform support bar 60 of the front frame 50 and the pivotable bar 30 of the rear frame 20 are positioned relative to the ground 11 so that the platform unit 16 has horizontal orientation in the expanded use configuration. The platform support bar 60 further couples with the platform latch 82 of the platform unit 16 to lock the foldable step stool 10 in the expanded use position when the platform latch 82 engages the platform support bar 60.

The left front leg 56 is pivotably coupled about the front leg axis 70 to the u-shaped handle rail 52 at the top of the leg and includes a foot at the base of the leg that engages the ground 11 as shown in FIG. 2. The left front leg 56 includes a substantially straight portion 73 and a rearwardly extending curved portion 74. The curved portion 74 is located at the top of the leg, above the substantially straight portion 73, where the left front leg 56 pivotably couples to the u-shaped handle rail 52. When the foldable step stool 10 is in the collapsed storage configuration, the curved portion 74 allows the straight portion 73 to be spaced apart from the left rear leg 26 to form a stool leg assembly gap therebetween. The stool leg assembly gap prevents a user from trapping their fingers in the assembly when the foldable step stool 10 is reconfigured from the expanded use configuration to the collapsed storage position.

The right front leg 58 is pivotably coupled about the front leg axis 70 to the u-shaped handle rail 52 at the top of the leg and includes a foot at the base of the leg that engages the ground 11 as shown in FIG. 2. The right front leg 58 includes a substantially straight portion 75 and a rearwardly extending curved portion 76. The curved portion 76 is located at the top of the leg, above the substantially straight portion 75, where the right front leg 58 pivotably couples to the u-shaped handle rail 52. When the foldable step stool 10 is in the collapsed storage configuration, the curved portion 76 allows the straight portion 75 to be spaced apart from the right rear leg 28 to form the stool leg assembly gap therebetween.

The U-shaped handle rail 52 is located at the top of the foldable step stool 10 and provides a stabilizing handle for a user to balance themselves when stood on the platform unit 16 and prevents a user from falling forward or sideways off the foldable step stool 10. The u-shaped handle rail 52 has a U-shape that is open on the aft side of the foldable step stool 10 so that a user can freely step into the foldable step stool 10 and be positioned centrally in the U-shaped handle rail 52. The U-shaped handle rail 52 has horizontal orientation when the foldable step stool 10 is in the expanded use configuration. The foldable step stool 10 is sized so that in the expanded use configuration, the U-shaped handle rail 52 is a similar distance from the ground 11 as a typical kitchen counter or table.

The U-shaped handle rail 52 includes handle pockets 62, a front handle portion 64, a left handle portion 66, a right handle portion 68, a front leg axis 70, and a rear leg axis 72 as shown in FIGS. 2 and 21. The handle pockets 62 form front corners of the u-shaped handle rail 52 and are interconnected by the front handle portion 64. The handle pockets 62 include recesses in the top surface that form a space that a user can store items in when using the foldable step stool 10 is in the expanded use configuration.

The front handle portion 64 is located along a forward edge of the U-shaped handle rail 52 so that it can be positioned adjacent to a kitchen counter or table when the foldable step stool 10 is in use as shown in FIG. 20. When the foldable step stool 10 is reconfigured from the expanded use configuration to the collapsed storage position, the user may pull upwardly on the front handle portion 64 to enable the pivoting motion of the foldable step stool 10.

The left handle portion 66 extends rearwardly from one of the handle pockets 62 along a left edge of the U-shaped handle rail 52 as shown in FIG. 2. The left handle portion 66 extends rearwardly to a terminal end where it pivotably couples to the left rear leg 26 of the rear frame 20. The left handle portion 66 and the left rear leg 26 pivot about the rear leg axis 72 that extends through the pivotable joint. The left handle portion 66 further pivotably couples to the left front leg 56 approximately midway along the length of the left handle portion 66. The left handle portion 66 and the left front leg 56 pivot about the front leg axis 70 that extends through the pivotable joint.

The right handle portion 68 extends rearwardly from one of the handle pockets 62 along a right edge of the U-shaped handle rail 52 as shown in FIG. 2. The right handle portion 68 extends rearwardly to a terminal end where it pivotably couples to the right rear leg 28 of the rear frame 20. The right handle portion 68 and the right rear leg 28 pivot about the rear leg axis 72 that extends through the pivotable joint. The right handle portion 68 further pivotably couples to the right front leg 58 approximately midway along the length of the right handle portion 68. The right handle portion 68 and the right front leg 58 pivot about the front leg axis 70 that extends through the pivotable joint.

The front leg axis 70 is positioned forward of the rear leg axis 72 when the foldable step stool 10 is in the expanded use configuration as shown in FIGS. 12 and 15. When the foldable step stool 10 is reconfigured from the expanded use configuration to the collapsed storage position, the front leg axis 70 rotates upward and aft around the rear leg axis 72 as shown in FIGS. 13 and 16. The front leg axis 70 is positioned above of the rear leg axis 72 when the foldable step stool 10 is in the collapsed storage position as shown in FIGS. 14 and 17.

The guide links 54 control the relative movement of the front frame 50 and the rear frame 20 as the foldable step stool 10 is reconfigured from the expanded use configuration to the collapsed storage position. The guide links 54 extend between the front frame 50 and the rear frame 20 and include a left guide link 77 and a right guide link 78 as shown in FIGS. 12-14. The left guide link 77 extends between the left front leg 56 and the left rear leg 26. The left guide link 77 pivotably couples to the left front leg 56 at the top of the straight portion 73. The left guide link 77 pivotably couples to the left rear leg 26 between the top of the left rear leg 26 and the pivotable bar 30. The left guide link 77 has C-shape so that the main arm of the left guide link 77 is spaced apart from the left front and rear legs 56, 26 to form a guide link assembly gap as shown in FIG. 18.

The right guide link 78 extends between the right front leg 58 and the right rear leg 28 as shown in FIGS. 12-14. The right guide link 78 pivotably couples to the right front leg 58 at the top of the straight portion 75. The right guide link 78 pivotably couples to the right rear leg 28 between the top of the right rear leg 28 and the pivotable bar 30. The right guide link 78 has C-shape so that the main arm of the right guide link 78 is spaced apart from the right front and rear legs 58, 28 to form a guide link assembly gap as shown in FIG. 18. The guide link assembly gaps prevent a user from trapping their fingers in the assembly when the foldable step stool 10 is reconfigured from the expanded use configuration to the collapsed storage position.

The platform unit 16 provides a stable horizontal surface for the user to stand on when the foldable step stool 10 is in the expanded use configuration as shown in FIG. 20. The platform unit 16 includes the platform step panel 80, the platform latch 82, a platform links 84, and platform collars 86 as shown in FIG. 2. The platform step panel 80 is pivotably coupled to the pivotable bar 30 of the rear frame

20 and detachably coupled to the platform support bar 60 of the front frame 50. The platform step panel 80 provides a rigid surface for a user to stand on and is sized so that a user has adequate space for standing securely. The platform step panel 80 is positioned on the foldable step stool 10 at a height above the ground 11 so that a user can reach a kitchen counter or similar elevated surface when stood on the platform step panel 80 as shown in FIG. 20. The top surface of the platform step panel 80 may include small circular raised portions to improve grip between the platform step panel 80 and a user's shoes or feet. In some embodiments, other patterns or shapes may be used on the platform step panel 80 to improve grip such other geometric shapes or patterns that extend across the width and length of the platform step panel 80.

The platform step panel 80 rests on the pivotable bar 30 and the platform collars 86 assemble under and around the pivotable bar 30 and coupled to the underside of the platform step panel 80 as suggested in FIG. 2. The platform collars 86 pivotably couple the platform step panel 80 to the pivotable bar 30 to allow the platform unit 16 to pivot around the pivotable bar 30 when the foldable step stool 10 is reconfigured as shown in FIGS. 12-17. The platform links 84 control the relative movement of the front frame 50 and the platform step panel 80 as the foldable step stool 10 is reconfigured from the expanded use configuration to the collapsed storage position. The platform links 84 extend between the platform step panel 80 and the platform support bar 60 of the front frame 50 as shown in FIGS. 10, 13 and 17.

The platform latch 82 is pivotably coupled to the platform step panel 80 and extends down from the platform step panel 80 and then rearward and under the platform support bar 60 of the front frame 50 to couple thereto in a locked position as shown in FIGS. 10 and 15A. The platform latch includes finger grooves 88 that extend around the front of the platform latch 82 that allow the user to comfortably grip and pull on the platform latch 82. When the platform latch 82 is in the locked position, the platform step panel 80 is prevented from decoupling from the platform support bar 60 and the foldable step stool is fixed in the expanded use configuration as shown in FIGS. 10, 15 and 15A. A user may rotate the platform latch 82 forward into an unlocked position that allows the platform latch 82 to clear the platform support bar 60 as shown in FIGS. 11 and 15A. In the unlocked position, the user can continue to pull upwardly on the platform latch 82 so that the platform step panel 80 detaches from the platform support bar 60 and pivots around the pivotable bar 30 of the rear frame 20. The foldable step stool 10 can then be reconfigured into the collapsed storage position.

To reconfigure the foldable step stool 10 from the expanded use configuration to the collapsed storage position, the following steps may be followed as suggested in FIGS. 9-17. The user may rotate the platform latch 82 forward to decoupled the platform latch 82 from the platform support bar 60 as shown in FIGS. 10 and 11. The user may then pull upward on the platform latch 82 to decouple the platform step panel 80 from the platform support bar 60 to start the foldable movement as shown in FIG. 12. The user may assist the initial foldable movement by also pulling upward on the front hand portion 64 of the U-shaped handle rail 52. The platform unit 16 begins to rotate about the pivotable bar 30 and the U-shaped handle 52 rotates about the rear leg axis 72 relative to the rear frame 20.

As the foldable movement continues, the front frame 50 pivots relative the U-shaped handle 52 about the front leg axis 70 and is pulled upward and aft relative to the rear frame 20 as shown in FIGS. 13 and 16. The guide links 54 pull the front frame 50 and the rear frame 20 together so that the lower portions of the front and rear frames 50, 20 approach at a faster rate than the upper portions of the front and rear frame 50, 20. The platform links 84 further pull the front frame 50 toward the platform unit 16 and the front frame 20 and help stabilize the assembly through the foldable movement.

As the foldable movement progresses so that the platform step panel and U-shaped handle rail are approximately at 45 degrees relative to the ground 11, the user may start to pull rearward on the platform latch 82 and the u-shaped handle rail 52. The foldable movement continues until the platform step panel 80 and the U-shaped handle rail 52 are in close to vertical alignment and in the foldable step stool 10 is in the collapsed storage position. The foldable step stool 10 now has a smaller footprint and can be stored away in a cupboard or hung on a wall.

The following numbered clauses include embodiments that are contemplated and non-limiting:

Clause 1. A foldable step stool movable from an expanded use position to a collapsed storage position, the step stool comprising a step unit including rear frame made up of a left rear leg, a right rear leg, a lower step that extends from the left rear leg to the right rear leg, and a pivot bar that extends from the left rear leg to the right rear leg above the lower step.

Clause 2. The foldable step stool of clause 1, any other suitable clause, or any combination of clauses, further comprising a stabilizer unit including a front frame and a U-shaped handle rail.

Clause 3. The foldable step stool of clause 2, any other suitable clause, or any combination of clauses, the front frame being made up of a left front leg, a right front leg, and a platform support bar that extends from the left front leg to the right front leg.

Clause 4. The foldable step stool of clause 3, any other suitable clause, or any combination of clauses, the U-shaped handle rail shaped to have a left handle portion that is pivotably coupled to the left rear leg and the left front leg at spaced apart locations, a right handle portion that is pivotably coupled to the right rear leg and the right front leg at spaced apart locations, and a front handle portion that extends from a front end of the left handle portion to the front end of the right handle portion.

Clause 5. The foldable step stool of clause 4, any other suitable clause, or any combination of clauses, further comprising a platform unit that is supported above ground underlying the foldable step stool by the step unit and the stabilizer unit when the foldable step stool is in the expanded use position.

Clause 6. The foldable step stool of clause 5, any other suitable clause, or any combination of clauses, wherein the platform unit includes a platform step panel coupled to the rear frame of the step unit to pivot about the pivot bar and a platform latch configured to selectively fix the platform step panel in place relative to the platform support bar to retain the foldable step stool in the expanded use position.

Clause 7. The foldable step stool of clause 6, any other suitable clause, or any combination of clauses, wherein the U-shaped handle rail provides a three-sided platform surround rail above the platform step panel so that a user may be surrounded on three sides when standing on the platform step panel.

Clause 8. The foldable step stool of clause 7, any other suitable clause, or any combination of clauses, wherein when the foldable step stool is in the expanded use position the left handle portion, the right handle portion, and the front handle portion of the U-shaped handle define a handle plane.

Clause 9. The foldable step stool of clause 8, any other suitable clause, or any combination of clauses, wherein the platform step panel defines a platform plane parallel to and arranged at least in part beneath the handle plane.

Clause 10. The foldable step stool of clause 9, any other suitable clause, or any combination of clauses, wherein when the foldable step stool is in the expanded use position the front handle portion of the U-shaped handle defines a forwardmost point of the foldable step stool spaced forward of a front side of the platform step panel.

Clause 11. The foldable step stool of clause 9, any other suitable clause, or any combination of clauses, further comprising a rear crossbar coupled to one of the left rear leg and the right rear leg at the handle plane to pivot from an entry position to a retention position.

Clause 12. The foldable step stool of clause 11, any other suitable clause, or any combination of clauses, wherein the rear crossbar in the entry position extends along the one of the left rear leg and the right rear leg so that a space between the left rear leg and the right rear leg at the handle plane is open to allow the user to pass when stepping onto the platform step panel.

Clause 13. The foldable step stool of clause 13, any other suitable clause, or any combination of clauses, wherein the rear crossbar in the retention position extends from the left rear leg to the right rear leg at the handle plane so that the space between the left rear leg and the right rear leg at the handle plane is blocked and the user is surrounded on all four sides when standing on the platform step panel.

Clause 14. The foldable step stool of clause 13, any other suitable clause, or any combination of clauses, wherein the rear crossbar includes a crossbar latch configured to selectively fix an end of the rear crossbar to the other one of the left rear leg and the right rear leg when the rear crossbar is in the retention position.

Clause 15. The foldable step stool of clause 9, any other suitable clause, or any combination of clauses, further comprising a rear cross bar that extends in a retention position from the left rear leg to the right rear leg of the step unit at the handle plane so as to cooperate with the U-shaped handle rail to surround the user standing on the platform step panel on all four sides.

Clause 16. The foldable step stool of clause 15, any other suitable clause, or any combination of clauses, wherein the rear cross bar is pivotably coupled to one of the left rear leg and the right rear leg for movement from the retention position to an entry position in which the rear cross bar is moved from a space from the left rear leg to the right rear leg at the handle plane so that the space is opened to allow for entry of the user moving onto the platform step panel through the space from the left rear leg to the right rear leg at the handle plane.

Clause 17. The foldable step stool of clause 9, any other suitable clause, or any combination of clauses, wherein the left front leg and the right front leg are shaped to have a primary portion and a top pivot portion that extends from the primary portion toward the rear frame forming an obtuse angle facing the rear frame when the foldable step stool is in the expanded use position.

Clause 18. The foldable step stool of clause 17, any other suitable clause, or any combination of clauses, wherein the top pivot portion of the left front leg is coupled to the left handle portion of the U-shaped handle along a front pivot axis about which the U-shaped handle pivots relative to the front frame.

Clause 19. The foldable step stool of clause 18, any other suitable clause, or any combination of clauses, wherein the top pivot portion of the right front leg is coupled to the right handle portion of the U-shaped handle along the front pivot axis about which the U-shaped handle pivots relative to the front frame.

Clause 20. The foldable step stool of clause 19, any other suitable clause, or any combination of clauses, wherein the left rear leg is coupled to the left handle portion of the U-shaped handle along a rear pivot axis about which the U-shaped handle pivots relative to the rear frame.

Clause 21. The foldable step stool of clause 20, any other suitable clause, or any combination of clauses, wherein the right rear leg is coupled to the right handle portion of the U-shaped handle along the rear pivot axis about which the U-shaped handle pivots relative to the rear frame.

Clause 22. The foldable step stool of clause 21, any other suitable clause, or any combination of clauses, wherein the rear pivot axis is spaced apart from the front pivot axis in the handle plane.

Clause 23. The foldable step stool of clause 7, any other suitable clause, or any combination of clauses, wherein the platform latch is coupled to the platform step panel to pivot relative to the platform step panel and configured to selectively engage the platform support bar to fix the platform step panel to the stabilizer unit when the foldable step stool is in the expanded use position.

Clause 24. The foldable step stool of clause 23, any other suitable clause, or any combination of clauses, wherein the platform latch is shaped to include a cam surface that is arranged to contact the platform support bar during motion of the foldable step stool from the collapsed storage position to the expanded use position.

Clause 25. The foldable step stool of clause 24, any other suitable clause, or any combination of clauses, wherein the cam surface is shaped to pivot the platform latch from a normally locked position to an unlocked position in response to contact with the platform support bar until the foldable step stool reaches the expanded use position when the cam surface moves out of contact with the platform support bar releasing the platform latch to return to the normally locked position in which it fixes the platform step panel to the step unit.

Clause 26. The foldable step stool of clause 23, any other suitable clause, or any combination of clauses, wherein the platform unit includes a platform link configured to control relative movement of the front frame and the platform step panel as the foldable step stool is reconfigured between the expanded use position to the collapsed storage position.

Clause 27. The foldable step stool of clause 26, any other suitable clause, or any combination of clauses, wherein the platform link is coupled to the front frame to pivot about the platform support bar.

Clause 28. The foldable step stool of clause 27, any other suitable clause, or any combination of clauses, wherein the platform link is coupled to the platform step panel to pivot about an axis parallel to the platform support bar.

Clause 29. The foldable step stool of clause 7, any other suitable clause, or any combination of clauses, wherein the stabilizer unit includes a guide link pivotably coupled at opposite ends to the rear frame and the front frame to control relative movement of the front frame and the rear frame as the foldable step stool is reconfigured from the expanded use position to the collapsed storage position.

Clause 30. The foldable step stool of clause 29, any other suitable clause, or any combination of clauses, wherein the guide link has C-shape so that a central portion of the guide link is spaced apart from the rear frame and the front frame to form a guide link assembly gap sized to prevent the user from trapping their fingers when the foldable step stool is reconfigured from the expanded use position to the collapsed storage position.

Clause 31. A foldable step stool movable from an expanded use position to a collapsed storage position, the step stool comprising a step unit including rear frame made up of a left rear leg, a right rear leg, a lower step that extends from the left rear leg to the right rear leg, and a pivot bar that extends from the left rear leg to the right rear leg above the lower step.

Clause 32. The foldable step stool of clause 31, any other suitable clause, or any combination of clauses, further comprising a stabilizer unit including a front frame made up of a left front leg, a right front leg, and a platform support bar that extends from the left front leg to the right front leg.

Clause 33. The foldable step stool of clause 32, any other suitable clause, or any combination of clauses, further comprising a platform unit that is supported above ground underlying the foldable step stool by the step unit and the stabilizer unit when the foldable step stool is in the expanded use position.

Clause 34. The foldable step stool of clause 33, any other suitable clause, or any combination of clauses, wherein the platform unit includes a platform step panel coupled to the rear frame of the step unit to pivot about the pivot bar configured to be supported on the platform support bar of the stabilizer unit when the foldable step stool is in the expanded use position.

Clause 35. The foldable step stool of clause 35, any other suitable clause, or any combination of clauses, wherein the stabilizer unit includes a U-shaped handle rail that provides a three-sided platform surround rail above the platform step panel when the foldable step stool is in the expanded use position so that a user may be surrounded on three sides when standing on the platform step panel.

Clause 36. The foldable step stool of clause 35, any other suitable clause, or any combination of clauses, wherein the U-shaped handle rail is shaped to have a left handle portion that is pivotably coupled to the left rear leg and the left front leg at spaced apart locations, a right handle portion that is pivotably coupled to the right rear leg and the right front leg at spaced apart locations, and a front handle portion that extends from a front end of the left handle portion to the front end of the right handle portion.

Clause 37. The foldable step stool of clause 36, any other suitable clause, or any combination of clauses, wherein the left handle portion, the right handle portion, and the front handle portion of the U-shaped handle define a handle plane.

Clause 38. The foldable step stool of clause 37, any other suitable clause, or any combination of clauses, wherein the platform step panel defines a platform plane parallel to and arranged at least in part beneath the handle plane when the foldable step stool is in the expanded use position.

Clause 39. The foldable step stool of clause 38, any other suitable clause, or any combination of clauses, further comprising a rear crossbar coupled to one of the left rear leg and the right rear leg at the handle plane to pivot from an entry position to a retention position, the rear crossbar in the entry position extends along the one of the left rear leg and the right rear leg so that a space between the left rear leg and the right rear leg at the handle plane is open to allow the user to pass when stepping onto the platform step panel, and the rear crossbar in the retention position extends from the left rear leg to the right rear leg at the handle plane so that the space between the left rear leg and the right rear leg at the handle plane is blocked and the user is surrounded on all four sides when standing on the platform step panel.

Clause 40. The foldable step stool of clause 36, any other suitable clause, or any combination of clauses, wherein when the foldable step stool is in the expanded use position the front handle portion of the U-shaped handle defines a forwardmost point of the foldable step stool spaced forward of a front side of the platform step panel.

Clause 41. The foldable step stool of clause 36, any other suitable clause, or any combination of clauses, wherein the left front leg and the right front leg are each shaped to have a primary portion and a top pivot portion that extends from the primary portion toward the rear frame forming an obtuse angle between the primary portion and the top pivot portion facing the rear frame when the foldable step stool is in the expanded use position.

Clause 42. The foldable step stool of clause 41, any other suitable clause, or any combination of clauses, wherein the top pivot portion of the left front leg is coupled to the left handle portion of the U-shaped handle along a front pivot axis about which the U-shaped handle pivots relative to the front frame.

Clause 43. The foldable step stool of clause 42, any other suitable clause, or any combination of clauses, wherein the top pivot portion of the right front leg is coupled to the right handle portion of the U-shaped handle along the front pivot axis about which the U-shaped handle pivots relative to the front frame.

The invention claimed is:

1. A foldable step stool movable from an expanded use position to a collapsed storage position, the step stool comprising a step unit including rear frame made up of a left rear leg, a right rear leg, a lower step that extends from the left rear leg to the right rear leg, and a rear cross member that extends from the left rear leg to the right rear leg above the lower step, a stabilizer unit including a front frame and a handle rail, the front frame being made up of a left front leg, a right front leg, and a front cross member that extends from the left front leg to the right front leg, and the handle rail including a left handle portion that is pivotably coupled to the left rear leg and the left front leg at spaced apart locations, a right handle portion that is pivotably coupled to the right rear leg and the right front leg at spaced apart locations, and a front handle portion that extends from the left handle portion to the right handle portion, and a platform unit that is supported above a ground underlying the foldable step stool by the step unit and the stabilizer unit when the foldable step stool is in the expanded use position, the platform unit including a platform step panel coupled to one of the rear frame and the front frame wherein the platform step panel is movable from a first position to provide a step when the foldable step stool is in the expanded use position and a second position when the foldable step stool is in the collapsed storage position, wherein the handle rail is configured to surround on three sides when standing on the platform step panel, wherein, when the foldable step stool is in the expanded use position, the left handle portion, the right handle portion, and the front handle portion of the handle rail define a handle plane, and wherein the step unit further includes a rear crossbar having a first end pivotably coupled to one of the left rear leg and the right rear leg and a second end opposite the first end, the rear crossbar being configured to pivot about a crossbar axis at the first end from an entry position to a retention position, the crossbar axis being perpendicular to at least one of the left rear leg and the right rear leg, wherein in the entry position, the rear crossbar extends along the one of the left rear leg and the right rear leg so that a space between the left rear leg and the right rear leg between the handle plane and the platform step panel is open to allow the user to pass when stepping onto the platform step panel, and, in the retention position, the rear crossbar is pivoted about the crossbar axis so that the second end of the rear crossbar is releasably coupled to the other of the left rear leg and the right rear leg so that the user is surrounded on all four sides when standing on the platform step panel, wherein when the rear crossbar is in the entry position, the rear crossbar is in parallel alignment with the right rear leg and extends downwardly along the length of the right rear leg from a pivoting pin coupled to the right rear leg to a crossbar storage latch pin coupled to the right rear leg located between the pivoting pin and the lower step to allow a user to step on to or step off the platform unit and when the rear crossbar is in the retention position, the rear crossbar extends horizontally relative to the platform step panel from the pivoting pin to a crossbar latch pin coupled to the left rear leg to prevent a user that is stood on the platform unit from falling backwards and off the foldable step stool.

2. The step stool of claim 1, wherein when the foldable step stool is in the expanded use position the platform step panel defines a platform plane parallel to and arranged at least in part beneath the handle plane.

3. The step stool of claim 2, wherein when the foldable step stool is in the expanded use position the front handle portion of the handle rail defines a forwardmost point of the foldable step stool spaced forward of a front side of the platform step panel.

4. The step stool of claim 2, wherein the left front leg and the right front leg are shaped to have a primary portion and a top pivot portion that extends from the primary portion toward the rear frame forming an obtuse angle facing the rear frame when the foldable step stool is in the expanded use position.

5. The step stool of claim 4, wherein the top pivot portion of the left front leg is coupled to the left handle portion of the handle rail along a front pivot axis about which the handle rail pivots relative to the front frame and the top pivot portion of the right front leg is coupled to the right handle portion of the handle rail along the front pivot axis about which the handle rail pivots relative to the front frame.

6. The step stool of claim 5, wherein the left rear leg is coupled to the left handle portion of the handle rail along a rear pivot axis about which the handle rail pivots relative to the rear frame, the right rear leg is coupled to the right handle portion of the handle rail along the rear pivot axis about which handle rail pivots relative to the rear frame, and the rear pivot axis is spaced apart from the front pivot axis in the handle plane.

7. The step stool of claim 1, wherein the rear crossbar includes a crossbar latch configured to releasably fix the second end of the rear crossbar to the other one of the left rear leg and the right rear leg when the rear crossbar is in the retention position.

8. The step stool of claim 1, wherein the platform unit further includes a platform latch configured to selectively fix the platform step panel in place relative to the front cross member to retain the foldable step stool in the expanded use position, the platform latch is coupled to the platform step panel to pivot relative to the platform step panel and configured to selectively engage the front cross member to fix the platform step panel to the stabilizer unit when the foldable step stool is in the expanded use position.

9. The step stool of claim 8, wherein the platform latch is shaped to include a cam surface that is arranged to contact the front cross member during motion of the foldable step stool from the collapsed storage position to the expanded use position, and the cam surface is shaped to pivot the platform latch from a normally locked position to an unlocked position in response to contact with the front cross member until the foldable step stool reaches the expanded use position when the cam surface moves out of contact with the front cross member releasing the platform latch to return to the normally locked position in which it fixes the platform step panel to the step unit.

10. The step stool of claim 8, wherein the platform unit includes a platform link configured to control relative movement of the front frame and the platform step panel as the foldable step stool is reconfigured between the expanded use position to the collapsed storage position, the platform link is coupled to the front frame to pivot about the front cross member, and the platform link is coupled to the platform step panel to pivot about an axis parallel to the front cross member.

11. The step stool of claim 1, wherein the stabilizer unit includes a guide link pivotably coupled to the rear frame and the front frame to control relative movement of the front frame and the rear frame as the foldable step stool is reconfigured from the expanded use position to the collapsed storage position.

12. The step stool of claim 11, wherein the guide link has a first end pivotably coupled to one of the right rear leg and the left rear leg of the rear frame and a second end pivotably coupled to a respective one of the right front leg and the left front leg, and wherein the guide link has a central portion between the first end and the second end that is spaced apart from the rear frame and the front frame to form a guide link assembly gap located laterally between the central portion of the guide link and the respective rear leg and the respective front leg and sized to prevent the user from trapping their fingers when the foldable step stool is reconfigured from the expanded use position to the collapsed storage position.

13. The step stool of claim 1, wherein the rear crossbar includes a crossbar latch configured to releasably fix the second end of the rear crossbar to the other one of the left rear leg and the right rear leg when the rear crossbar is in the retention position.

* * * * *